United States Patent
Shigeoka et al.

(10) Patent No.: US 12,264,931 B1
(45) Date of Patent: Apr. 1, 2025

(54) NAVIGATION ASSISTANCE USING SPATIAL AUDIO

(71) Applicant: Apple Inc., Cupertino, CA (US)

(72) Inventors: Katherine S. Shigeoka, Santa Cruz, CA (US); Jonathan D. Sheaffer, San Jose, CA (US); Andrew P. Bright, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 420 days.

(21) Appl. No.: 16/783,929

(22) Filed: Feb. 6, 2020

Related U.S. Application Data (60) Provisional application No. 62/804,656, filed on Feb. 12, 2019.

(51) Int. Cl.

| G01C 21/36 | (2006.01) |
|---|---|
| G02B 27/01 | (2006.01) |
| G06V 20/10 | (2022.01) |
| H04R 3/04 | (2006.01) |
| H04R 5/033 | (2006.01) |
| H04R 5/04 | (2006.01) |

(52) U.S. Cl.
CPC ..... *G01C 21/3629* (2013.01); *G02B 27/0172* (2013.01); *G06V 20/10* (2022.01); *H04R 3/04* (2013.01); *H04R 5/033* (2013.01); *H04R 5/04* (2013.01); *G02B 2027/0138* (2013.01); *G02B 2027/0178* (2013.01); *H04R 2460/01* (2013.01)

(58) Field of Classification Search
None
See application file for complete search history.

(56) References Cited

U.S. PATENT DOCUMENTS

| 9,792,501 | B1 | 10/2017 | Maheriya et al. |
|---|---|---|---|
| 9,825,598 | B2 | 11/2017 | Kraft et al. |
| 9,886,954 | B1 | 2/2018 | Meacham et al. |
| 2001/0046304 | A1* | 11/2001 | Rast ............. H04R 1/1083 381/26 |

(Continued)

OTHER PUBLICATIONS

Bujacz et al., "Sound of Vision—Spatial Audio Output and Sonification Approaches", Jul. 6, 2016, Miesenberger K., Bühler C., Penaz P. (eds)Computers Helping People with Special Needs. ICCHP 2016. Lecture Notes in Computer Science, vol. 9759. Springer, Cham.

*Primary Examiner* — James K Mooney
(74) *Attorney, Agent, or Firm* — Aikin & Gallant, LLP (57) ABSTRACT

A method for providing navigation assistance using a head-worn device that has a camera, several microphones, and several speakers. The method captures sound in an environment as a plurality of microphone audio signals, captures, using the camera, a scene of the environment as a digital image, and processes the digital image to detect an object therein. The method selects, in response to the detection of the object, one of several navigation audio rendering modes. The several navigation audio rendering modes include a first mode that activates an acoustic transparency function to cause the speakers to reproduce the sound of the environment, a second mode that sonifies the object and activates the acoustic transparency function, and a third mode that sonifies the object, partially activates the acoustic transparency function, and an activates active noise cancellation function.

20 Claims, 5 Drawing Sheets

(56) References Cited

U.S. PATENT DOCUMENTS

| | | | |
|---|---|---|---|
| 2012/0062357 A1* | 3/2012 | Slamka | G01C 21/20 340/4.11 |
| 2015/0002808 A1* | 1/2015 | Rizzo, III | A61N 1/36046 351/158 |
| 2015/0211858 A1* | 7/2015 | Jerauld | G09B 21/006 701/541 |
| 2016/0209916 A1* | 7/2016 | Sendai | G06F 3/017 |
| 2016/0342840 A1* | 11/2016 | Mullins | G06V 20/20 |
| 2017/0318407 A1* | 11/2017 | Meister | H04S 7/303 |
| 2019/0179604 A1* | 6/2019 | Alexander | H04R 3/04 |
| 2019/0290492 A1* | 9/2019 | Hendrix | A61F 9/08 |

* cited by examiner

NAVIGATION ASSISTANCE USING SPATIAL AUDIO

CLAIM OF BENEFIT TO RELATED APPLICATIONS

This non-provisional patent application claims the benefit of U.S. provisional patent application No. 62/804,656, filed Feb. 12, 2019.

FIELD

An aspect of the disclosure here relates to a head-worn electronic device switching between navigation audio rendering modes during navigation assistance, in response to the detection of an object within the head-worn device's travel path.

BACKGROUND

A navigation application that executes on an electronic device, such as a smartphone or a personal navigation device (PND), provides its user with turn-by-turn navigation as the user travels along a route from point A to point B. To navigate, the user initiates the navigation application and enters a destination (e.g., point B) through a user interface on the electronic device. The destination, along with the electronic device's current position (e.g., point A), which may be determined through global positioning system (GPS) data (e.g., acquired through a GPS chip in the electronic device), is transmitted to a navigation server. The server computes an optimal route and transmits the route to the electronic device, along with map data. These are then used by the electronic device to present a virtual representation of the route on a screen of the electronic device. As the user traverses the route, the navigation application provides visual and/or audible instructions to the user to guide the user along the route. In addition to providing instructions, the navigation application may update the map data according to the user's changing position along the route. Such navigation systems may be implemented to provide instructions and map data during vehicle navigation as well as walking navigation.

SUMMARY

In recent years, object detection technology has been utilized to inform a user of characteristics of nearby objects. For example, object detection systems have been integrated into small portable devices, such as wearable devices, to help users with visual impairments or who are blind, to navigate through an unfamiliar environment. For instance, such devices may act as a "virtual white cane" that alerts the user of a nearby obstacle that is detected using a sensor (e.g., a camera or a proximity sensor) integrated into the device. Once an obstacle is detected, the device provides an audible response that is outputted through earphones that are worn by the user. For example, if the obstacle was a table, the audible response heard by the user may be synthesized speech of the word table. These conventional devices, however, have drawbacks. For instance, the earphones may prevent the user from hearing ambient sounds within the user's environment, due to their passive noise cancellation design, which physically blocks ambient sounds from entering the ear canal while worn by the user.

An aspect of the disclosure here is a computerized method performed by a data processor in a head-worn device (e.g., smart glasses) that is capable of providing audible navigation assistance while operating in one of several navigation audio rendering modes. The device includes several microphones that capture the ambient sound (a sound field of the user's environment.) To provide the navigation assistance, the device obtains one or more digital images captured by a camera with a frontal field of view in relation to the user, and processes the image to detect an object therein. For instance, the object may be a chair that is in front of the user. In response to the detection of the object, the device selects one of the navigation audio rendering modes in accordance with which sound playback occurs through a number of speakers (e.g., earpiece speakers that are integrated into earphones) of the device.

For example, if the detected object is determined by the processor to be far away, the device may select a first (or "normal") navigation audio rendering mode in which sound played back by the earphones of the device is a reproduction of the ambient sound that is captured by the device's microphones. To accomplish this, the device activates an acoustic transparency function to cause the earphones to reproduce the ambient sounds in the sound field of the environment in a "transparent" manner, e.g., as if the earphones were not being worn by the user.

If, however, the detected object is determined to be within a travel path of the user or is within a "medium" distance to the user, between close and far (e.g., ten feet away), the device may select a second (or "aware") navigation audio rendering mode. In the second mode, sound played back by the device includes the reproduction of the ambient sound of the sound field and includes a sonification of the detected object to audibly bring the object to the user's attention. To "sonify" an object, the device produces an audio signal that is associated with the object, and spatially renders the audio signal at a virtual sound source in the reproduced sound field. For example, in the case of the chair that is in front of the user, the device may spatially render the audio signal to cause the earphones to reproduce the phrase "chair" as if the phrase were being emitted by a sound source at the physical location of the chair with respect to the user.

In the case where the detected object is determined to be close to the user, such as if the chair were right in front of the user (e.g., within a two feet), the device may select a third (or "alert") navigation audio rendering mode in which sound played back by the device includes anti-noise from an anti-noise signal that is produced by an activated active noise cancellation (ANC) function, and includes the sonification of the detected object, which may be similar to the second navigation audio rendering mode. Unlike the other modes, however, since the detected object is close to the user, the device activates the acoustic transparency function only up to a partial (not full) level, in order to reproduce only a portion of the sound field in the environment. The partial activation of the acoustic transparency function may, for example, reduce the volume of the reproduced ambient sounds, so as to not distract the user from the sound of the sonified object.

Another aspect of the disclosure is a method performed by a head-worn device to contextually sonify a detected object by producing and spatially rendering an audio signal that is associated with the object in order to provide the user a better audible representation of the object. To audibly represent the object, the object may be sonified through either non-speech sound cues, such as "dings", or through speech, as described herein. To decide how to represent the object, the device determines a level of importance of the object: an object with a high level of importance is sonified through speech and an object with a low level of importance is sonified through non-speech. For instance, an object that is meant to convey information to the user, such as a street sign, may be assigned a high level of importance (and the device sonifies the words inscribed on the sign). In contrast, a detected object that does not convey information, such as a trash can, may be assigned a low level of importance, since the device may only want to bring such an object to the user's attention without the need for specifically calling out the object.

The above summary does not include an exhaustive list of all aspects of the disclosure. It is contemplated that the disclosure includes all systems and methods that can be practiced from all suitable combinations of the various aspects summarized above, as well as those disclosed in the Detailed Description below and particularly pointed out in the claims. Such combinations may have particular advantages not specifically recited in the above summary.

BRIEF DESCRIPTION OF THE DRAWINGS

The aspects are illustrated by way of example and not by way of limitation in the figures of the accompanying drawings in which like references indicate similar elements. It should be noted that references to "an" or "one" aspect of this disclosure are not necessarily to the same aspect, and they mean at least one. Also, in the interest of conciseness and reducing the total number of figures, a given figure may be used to illustrate the features of more than one aspect, and not all elements in the figure may be required for a given aspect.

DETAILED DESCRIPTION

Several aspects of the disclosure with reference to the appended drawings are now explained. Whenever the shapes, relative positions and other aspects of the parts described in a given aspect are not explicitly defined, the scope of the disclosure here is not limited only to the parts shown, which are meant merely for the purpose of illustration. Also, while numerous details are set forth, it is understood that some aspects may be practiced without these details. In other instances, well-known circuits, structures, and techniques have not been shown in detail so as not to obscure the understanding of this description.

Figure 1A:
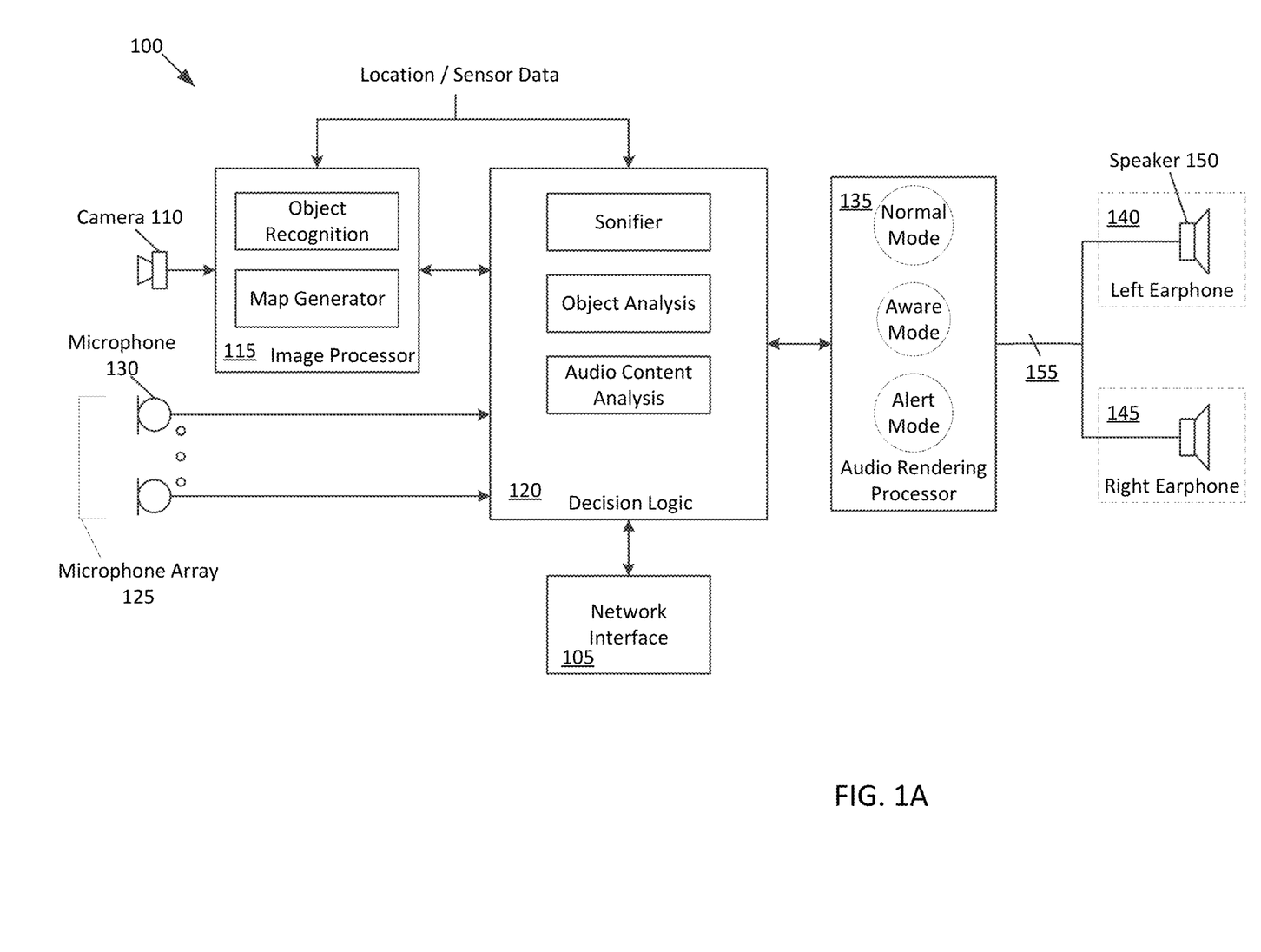
FIG. 1A shows a block diagram of a head-worn device.

FIG. 1A shows a block diagram of a head-worn device 100 configured to provide navigation assistance to the user (wearer) of the device 100, while the user is traveling (traversing) through an environment. Specifically, the head-worn device 100 is configured to detect objects contained within the environment, and in response to detecting objects, performing audio processing operations to produce sound through earphones 140 and/or 145 to assist the user in navigating the environment. For example, the sound produced by the earphones 140 and 145 alerts the user (or makes the user aware) of a detected object within the environment in order to prevent the user from colliding with the object. In one aspect, the sound is spatially rendered at a virtual sound source produced by the earphones that corresponds to a physical location (or position) at which the object is detected within the environment with respect to the user in order to audibly inform the user of the object's position. For instance, in the case in which the user is vision impaired, the device 100 may provide the user with a specific spatial sound cue (e.g., through the use of spatial transfer functions, such as head related transfer functions (HRTFs)) at the location of a nearby object (e.g., a chair) in order to help the user avoid colliding with the chair. In one aspect, such sound cues may include speech and/or non-speech sounds.

In one aspect, the head-worn device 100 may be any electronic device that includes at least a camera, one or more microphones, and one or more (e.g., built-in) speakers. In one aspect, the head-worn device 100 may be a hearable device, such as smart glasses or a helmet. In some aspects, the head-worn device 100 may be a combination of electronic devices that work in concert with each other. For instance, the device 100 may include wireless (e.g., BLUETOOTH) earphones that are paired with another electronic device, such as a wearable device or a portable device (e.g., a smartphone). In such a case, the other electronic device may perform at least the audio processing operations while having the wireless earphones produce the resulting sound. In one aspect, the device 100 is a wireless device in which a network interface 105 is configured to establish a wireless communication link with another electronic device in order for the device 100 to exchange data with the other electronic device. In one aspect, the network interface 105 is configured to establish a wireless communication link with a wireless access point in order to exchange data with an electronic server over a wireless network (e.g., the Internet).

The device 100 includes a camera 110, an image processor 115, decision logic 120 (also referred to as a decision processor), a microphone array 125 that includes one or more microphones 130, the network interface 105, an audio rendering processor 135, a left earphone 140, and a right earphone 145. In one aspect, the camera 110 is a complementary metal-oxide-semiconductor (CMOS) image sensor that is capable of capturing digital images including image data that represent a field of view of the camera 110, where the field of view includes a scene of an environment in which the device 100 is located. In some aspects, the camera 110 may be a charged-coupled device (CCD) camera type. The camera 110 is configured to capture still digital images and/or video that is represented by a series of digital images. In one aspect, the camera is at a frontal position of the device 100 with respect to the user. In another aspect, the camera may be positioned differently and/or there may be more than one camera.

Digital images captured by the camera 110 are received by the image processor 115 that is configured to perform image processing operations. The image processor 115 may be implemented as a programmed, digital microprocessor entirely or as a combination of a programmed processor and dedicated hardwired digital circuits such as digital filter blocks and state machines. The image processor 115 is configured to perform object recognition (e.g., through the use of an object recognition algorithm) upon digital images captured by the camera 110 in order to detect objects that are captured within the field of view of the camera 110. For example, the image processor 115 processes the digital images to identify patterns therein (e.g., structural patterns) and compare them to previously stored patterns therein. Once a matching pattern is found, the image processor 115 is said to detect the object within the digital image. In one aspect, rather than perform object recognition locally, the device 100 may transmit digital images captured by the camera 110 via the network interface 105 to another electronic device (or server) to perform an object recognition algorithm upon the digital images. The result of the performed algorithm (e.g., the detection of the object), may be transmitted back to the device 100.

The image processor 115 is further configured to generate a map of the environment in which the device 100 is located using the digital images captured by the camera 110. As will be described later, the generated maps may be used by the decision logic 120 to select one of several navigation audio rendering modes to provide navigation assistance to the user of the device 100. While the device 100 is worn by a user, the device 100 may generate a map of the user's environment without any explicit command from the user to do so. Specifically, the image processor 115 may generate the map in the background while the device 100 is performing other (e.g., audio rendering) operations. In one aspect, the generated map may be stored as a data structure that includes positions of objects contained within the environment with respect to a position of the device 100. The image processor 115 may detect objects within the field of view of the camera 110 using object recognition. To determine the positions of the detected objects within the field of view of the camera 110, the image processor 115 may use computer vision triangulation in which a point in space is determined, given its projections onto two or more digital images, relative to the device's known location and/or orientation when the two or more digital images were captured by the camera 110 of the device 100. For instance, to determine the device's location, the image processor 115 may retrieve location data (e.g., global positioning system (GPS) data from a GPS chip within the device) that represents a current location of the device 100. In one aspect, the image processor 115 may retrieve the location data from an application that is currently executing on the device 100. To determine the device's orientation, the image processor 115 may use sensor data from an orientation sensor (e.g., an accelerometer or a gyroscope). With the known location and orientation, the image processor 115 may cause the camera 110 to capture several images while the device 100 moves within the environment. The image processor 115 may determine the location of the detected object using the two images and knowing the change in the device's location and/or orientation of the device 100. In some aspects, the device 100 may include two or more cameras, where the determination of the position of the detected object may be performed using images captured by both cameras, by knowing the predefined distance between the two cameras. In one aspect, the user of the device 100 may manually enter the location of the objects within the environment (e.g., through a user interface of the device 100). In other aspects, the image processor 115 may determine the position of the detected object through any known methods.

In one aspect, the image processor 115 is configured to generate a map of the environment, along a travel path between two locations. Specifically, the image processor 115 may generate the map as the user of the device 100 walks from one location to another (e.g., while the user walks from one room to another room in the user's house, while the user walks from the user's house to a department store, etc.). In this case, the image processor 115 may generate the map and associate it with a travel path that is determined based on location data that is retrieved by the device 100 while the user traverses the environment. In one aspect, the positions of the detected objects may be determined with respect to the travel path along which the device 100 traverses through the environment. As the device 100 traverses through the environment, the image processor 115 may continually generate the map (e.g., determining positions of objects while the device 100 moves through the environment), thereby generating a map throughout the whole travel path of the device 100.

In one aspect, the image processor 115 may generate a map of an environment, while the device 100 travels along a travel path between two locations in response to a determination that the device 100 is traveling along a previously traveled path. Rather than continuously generate a map (e.g., in the background), the image processor 115 may limit the generation of maps to travel paths along which the user consistently travels (e.g., paths along which the user has traveled at least once before). In some aspects, the image processor 115 is configured to determine that the device 100 is traveling a previously traveled path based on certain criteria. For example, the image processor 115 may determine that a current travel path is a same (or similar) to a previous travel path, by predicting a destination of the device 100 based on a current location of the device 100, time of day, etc. In some aspects, the image processor 115 may generate a map of an environment along a path of travel, and upon a determination that the path of travel is the same (or similar) to a previous travel path, the image processor 115 may continue to generate the map and/or store the map (and travel path) for later use. Otherwise, if it is determined that the path of travel is new, the image processor 115 may cease generation of the map. In one aspect, the image processor 115 may transmit, via the network interface 105, the generated map to a remote device (e.g., an electronic database) for later retrieval, as described herein. In some aspects, the generation of the map may be based on an explicit request for the device 100 to provide navigation instructions.

In one aspect, the network interface 105 is configured to retrieve audio content over the wireless communication link that is to be played back through the earphones 140 and 145. Both earphones 140 and 145 include a respective speaker 150, which may be an electrodynamic speaker driver (e.g., acoustic transducer). Each earphone "outputs" or "plays back" audio using its respective speaker 150 to convert an analog or digital speaker driver signal into sound. In one aspect, the driver amplifiers in the earphones can receive an analog input from a respective digital to analog converter, where the later receives its input digital audio signal from the rendering processor 135.

In one aspect, the earphones 140 and 145 each include a housing that contains the earpiece speaker 150, and is desired to fit around the ear, over the ear, or in the ear (e.g., earbud) of a wearer of the head-worn device. As illustrated in FIG. 1A, there may be a left housing for the left ear, and a right housing for the right ear. As previously described, the earphones 140 and 145 may be part of a head-worn device such as a helmet, eye glasses, or a pair of headphones (e.g., composed of a bridge to which left and right earcups are attached). In one aspect, rather than each earphone 140 and 145 including a single speaker 150, the earphones may each include two or more speakers. In one aspect, each of the several speakers may be specially designed for sound output at different frequency bands.

The individual digital (or analog) audio driver signal for each of the speakers 150 is delivered through an audio communication link 155, from the rendering processor 135. As previously described, the device 100 may be a combination of electronic devices, such that the earphones 140 are 145 are separate from the other elements of the device 100. In this instance, the audio communication link 155 is more likely to be a wireless digital communication link, such as a BLUETOOTH link or a wireless local area network link that is established by the network interface 105. In other instances, however, the audio communication link 155 may be over a physical cable, in the case of wired earphones (e.g., earbuds). While, in another aspect, the earphones may be built into (e.g., a housing) of the device 100. In one aspect, one or more elements of the device 100 may be formed within the earphones 140 and/or 145. For instance, each earphone may include a rendering processor 135.

In one aspect, rather than (or in addition to) having speakers 150 in the housing of earphones 140 and 145, one or more of the speakers 150 may be extra aural speakers that may be integrated (or built into) a housing of the device 100. Such extra aural speakers may be arranged to project (or output) sound directly into the environment rather than directly into an ear of the user. In one aspect, the extra aural speakers may produce directional beam patterns (in the case in which the audio rendering processor 135 includes a beamformer) that are directed to locations within the environment, such as an ear of the user of the device 100.

The audio rendering processor 135 is to receive program audio of a piece of sound program content (e.g., from the decision logic 120 and/or the network interface 105). This program may include a number of input audio channels, such as a left channel for the left earphone 140, and a right channel for the right earphone 145. Such program audio may be that of a musical work, which may have been originally recorded as only two channels. Alternatively, the program audio may be in the form of more than two input audio channels, such as for example 5.1-surround format. In this particular case, the rendering processor 135 may downmix the input channels in order to produce one channel for each earphone. In another aspect, the program audio may be in the form of a single, input audio channel, where each earphone is to receive the same channel. In some aspects, the single, input audio channel may be upmixed in order to produce a left channel and a right channel. In one aspect, the rendering processor may perform downmixing operations and/or upmixing operations through any known methods. In all of these instances, the program audio is converted into sound by the speakers 150, after having been rendered by the rendering processor 135 which transforms the input channels into individual input drivers to the speakers 150. The rendering processor 135 may be implemented as a programmed, digital microprocessor entirely, or as a combination of a programmed processor and dedicated hardwired digital circuits such as digital filter blocks and state machines.

The audio rendering processor 135 is further configured to receive microphone signals from the microphones 130 of the microphone array 125 (e.g., from the decision logic 120), to perform operations thereon. Each of the microphones 130 may be any type of microphone (e.g., a differential pressure gradient micro-electro-mechanical system (MEMS) microphone) that will be used to convert acoustical energy caused by sound wave propagating in an acoustic space into an electrical microphone signal. In some aspects, the rendering processor 135 may include a sound pickup beamformer that can be configured to process the microphone signals produced by the microphones 130 to form directional beam patterns for spatially selective sound pickup up in certain directions, so as to be more sensitive to one or more sound source locations. In another aspect, the audio rendering processor 135 may include a sound output beamformer that is configured to produce speaker driver signals which when driving two or more speakers 150 of the device 100 produce spatially selective sound output. In one aspect, the rendering processor 135 may process the microphone signals to reproduce a sound field that was pickup by the microphones 130 in the array 125 within the environment in which the device 100 is located. The microphone signals may be spatially rendered into the driver signals to drive the speakers 150, to reproduce the sound sources of the sound field. As will be described later, the audio rendering processor 135 may process the microphone signals from to reproduce at least a portion of the sound field according to a selected navigation audio rendering mode.

The rendering processor 135 may have several navigation audio rendering modes, for example a "normal" (e.g., first) navigation audio rendering mode, an "aware" (e.g., second) navigation audio rendering mode, and an "alert" (e.g., third) navigation audio rendering mode. For each audio rendering mode, the rendering processor 135 is configured to perform distinct audio processing operations (e.g., functions) upon input audio signals (e.g., microphone signals) to cause the earphones 140 and 145 to output different reproductions of a sound field of the microphone signals. In one aspect, the rendering processor 135 may have more or less navigation audio rendering modes, The audio rendering processor 135 is pre-configured with such operating modes, and its current operating mode can be selected and changed by the decision logic 120 in real time, while the device 100 is providing navigation assistance to the user. More about the navigation rendering modes is described in FIG. 1B.

The decision logic 120 (decision processor) may be implemented as a programmed processor, e.g., by sharing the central processing unit, applications processor or system on a chip that includes at least one of the image processor 115 and the rendering processor 135, or by the programming of a different microprocessor. The decision logic 120 may make several different decisions and/or perform several different navigation operations and audio processing operations. The decision logic 120 may automatically (e.g., without requiring immediate input from a user of the device 100 to) select and/or change the navigation audio rendering mode during output of sound, based on detected objects within the environment. Specifically, the decision logic is said to select one of several navigation audio rendering modes in accordance with which sound playback occurs through the speakers 150 of the earphones 140 and 145, in response to the detection of an object and/or a detection of movement of the object within the environment. For example, the selected mode configures the rendering processor 135 to drive the speakers 150 of the earphones to output different reproductions of sound picked up by the microphone array 125 in order to provide different levels of navigation assistance to the user. In one aspect, the audio rendering processor 135 performs the automatic selection of the one of several navigation audio rendering modes. More about how the decision logic 120 selects a navigation audio rendering mode is described in FIG. 2.

In one aspect, the decision logic 120 is configured to perform a sonifier function to sonify a detected object by producing an object audio signal that is associated with the detected object. Specifically, when the audio signal is used to drive the speakers 150 of the earphones 140 and 145, the sound outputted by the speakers conveys information about the detected object to the user. For example, when the detected object is a street sign, the audio signal may include speech that describes the sign (e.g., "Main Street"). As another example, when the detected object is an object, such as a trashcan, the object audio signal may include non-speech sound cues that informs the user of the object, but does not provide any descriptive information about the object (e.g., "dings" or single frequency sound pulses). To output the audio signal as described herein, the rendering processor 135 is configured to spatially render the audio signal, such that sound of the object audio signal is outputted by the earphones at a virtual sound source that corresponds to a physical location of the detected object within the environment, with respect to the user of the device 100. For example, the audio signal may be rendered binaurally by applying HRTFs that may be personalized for the user of the device 100 in order to account for the user's anthropometrics. Thus, in the case of a street sign, when the street sign is in front of the user, the rendering processor 135 is configured to binaurally render the audio signal to cause sound of the audio signal to be produced in front of the user, as if the physical sign was producing the sound (e.g., through its own loudspeaker). More about how the decision logic 120 sonifies a detected object is described in FIG. 3.

In one aspect, the device 100 may be a head-worn display that includes a display in front of one or both of the user's eyes. Upon the display, the device 100 may present digital images or videos. In one aspect, the displays may be miniature versions of known displays, such as liquid crystal displays (LCDs), organic light-emitting diodes (OLEDs), etc. In another aspect, the display may be an optical display that is configured to project digital images upon a transparent (or semi-transparent) overlay, through which a user can see.

Figure 1B:
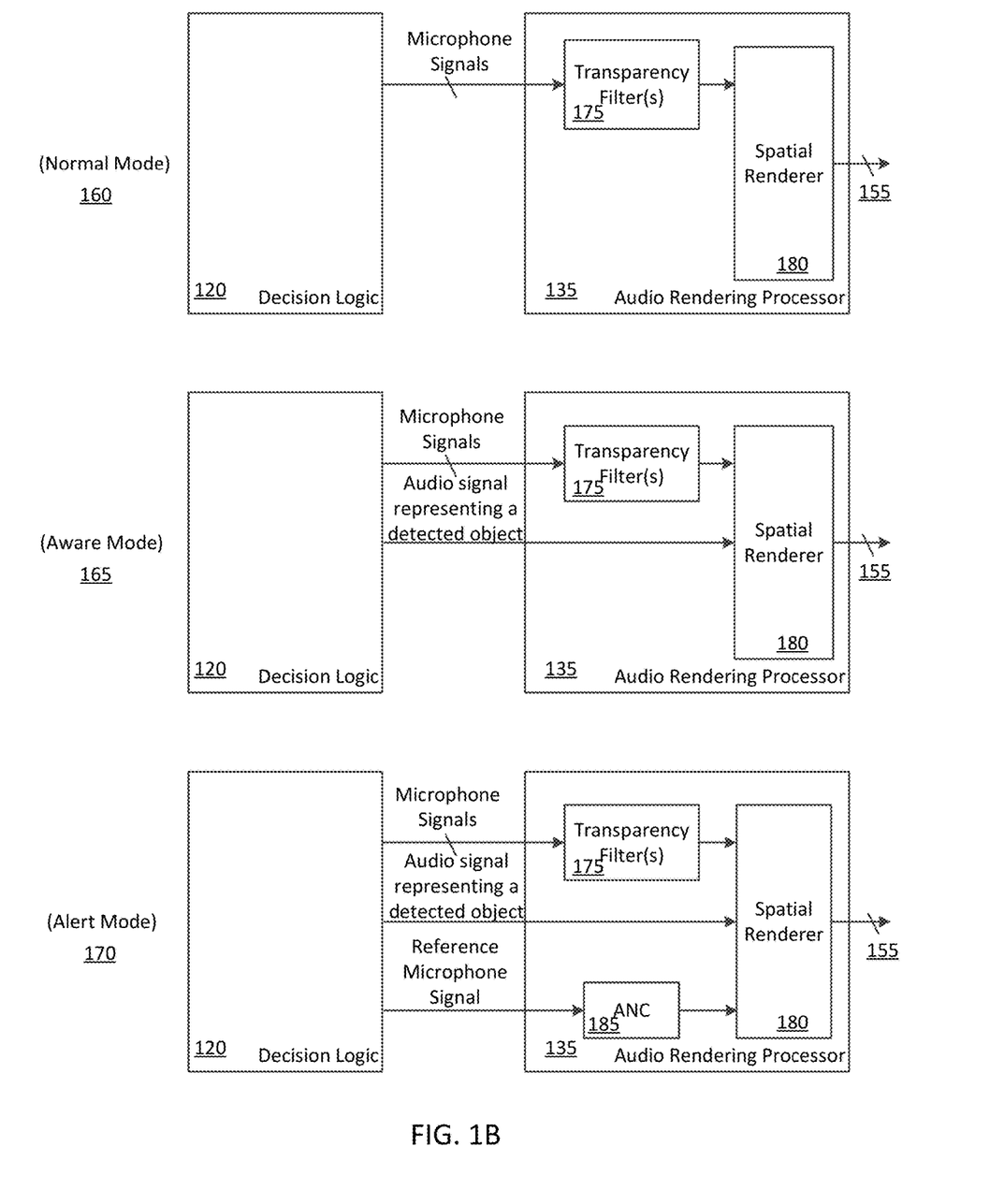
FIG. 1B shows a block diagram of operations performed within a rendering processor of a head-worn device for each of several navigation audio rendering modes.

FIG. 1B shows a block diagram of operations performed within the audio rendering processor 135 of the device 100 for each of the previously mentioned navigation audio rendering modes. Stage 160 of this figure illustrates the functions performed by the audio rendering processor 135 while the normal navigation audio rendering mode is selected. This mode is referred to as "normal", because while in this mode, the device 100 is not sonifying any particular detected object within the environment in order to bring a detected object to the user's attention. In this mode, the device 100 activates an acoustic transparency function to render microphone signals of ambient sound captured by the microphones 130 in the microphone array 125 within the environment in which the device 100 is located to cause the earphones 140 and/or 145 to reproduce the ambient sound. Specifically, this function enables the wearer of the device 100 to also hear the ambient sound within the environment more clearly, and preferably in a manner that is "transparent" as possible, e.g., as if the device 100 was not being worn by the user. To do this, the audio rendering processor 135 obtains microphone (e.g., ambient audio) signals from the microphone array 125. The signals include a set of sounds in the sound field of the environment in which the user of the device 100 is located, where each of the set of sounds are emitted from a corresponding sound source at a location within the environment. The audio rendering processor 135 processes the microphone signals captured by the microphone array 125 by filtering the signals through transparency filters 175 to produce filtered signals. In one aspect, the audio rendering processor 135 applies a specific transparency filter for each microphone signal. In some aspects, the transparency filters 175 reduce acoustic occlusion due to the earphones being in, on or over the user's ear, while also preserving the spatial filtering effect of the wearer's anatomical features (e.g., head, pinna, shoulder, etc.). The filters 175 may also help preserve the timbre and spatial cues associated with the actual ambient sound. Thus, in one aspect, the filters 175 may be user specific, according to specific measurements of the user's head. For instance, the audio rendering processor 135 may determine the transparency filters 175 according to a HRTF or, equivalently, head related impulse response (HRIR) that is based on the user's anthropometrics.

Each of the filtered signals from the transparency filters 175 may be combined, and further processed by a spatial renderer 180 to produce a left driver signal for the left earphone 140, and a right driver signal for the right earphone 145. In one aspect, the spatial renderer 180 is configured to perform audio processing operations upon the combined filtered signals from the transparency filters 175. For instance, the spatial renderer 180 may perform one of spectral shaping and dynamic range control of the filtered signals. As a result of being in the normal navigation audio rendering mode, the user may continue to traverse a travel path through the environment, knowing that there are no future or immediate dangers. In one aspect, the spatial renderer 180 may spatially render the filtered signals. In another aspect, the spatial renderer 180 does not spatially render the filtered signals.

Stage 165 of this figure illustrates the functions performed by the rendering audio processor 135 while in the aware navigation audio rendering mode. This mode is referred to as "aware", because there is a detected object that the device wants to bring to the user's attention, but not in an obtrusive way. In this mode, similar to the normal mode, the device 100 reproduces the sounds captured by the microphones 130 in the microphone array 125 through the activation of the acoustic transparency function. In addition to reproducing the sounds, the decision logic 120 transmits an object audio signal, which was produced by sonifying a detected object, to the spatial renderer 180, in order to spatially render the audio signal. In one aspect, the audio signal is spatially rendered with the filtered transparency signals produced by the transparency filter 175. In one aspect, to spatialize the audio signal, the spatial renderer 180 may perform binaural rendering in which the spatial renderer 180 applies spatial filters (e.g., HRTFs) to the audio signal to produce binaural signals (e.g., a left audio signal and a right audio signal), which when outputted through respective earphones produces a desired three-dimensional (3D) sound. In one aspect, the HRTFs are chosen according to the position data of the detected object in order to create a virtual sound source that is located at a position within the reproduced sound field that corresponds to the actual (e.g., physical) position of the object within the environment. Thus, the desired 3D sound provides an acoustic depth that is perceived by the user at a distance that corresponds to the actual distance/location of the object within the environment. In one aspect, to achieve a correct distance at which the virtual sound source is created, the spatial renderer 180 may apply additional linear filters upon the audio signal, such as reverberation and equalization. In one aspect, the audio rendering processor 135 may beamform the spatially rendered audio signal (and/or the filtered signals from the transparency filters 175) to output sound of the audio signal at a particular location.

In one aspect, as described herein, the HRTFs are personalized for the user of the device 100 to accommodate for the user's anthropometrics. Specifically, the device 100 may perform a personalization setup process in which personalized HRTFs are determined based on sensor data (e.g., image data of the user's head, etc.) In one aspect, the user may manually input anthropometric data that the device 100 uses to determine appropriate HRTFs.

In one aspect, the spatial filters are selected based on position data of the detected object with respect to the device 100. In one aspect, if the orientation of the device 100 changes (e.g., the head of the user moves), the virtual sound source will change as well. The spatial renderer 180 may compensate by adjusting the spatial filters to account for the change in order for the virtual sound source to remain in the same location as the physical location of the object with respect to the device 100. In one aspect, when the object is moving (e.g., a car) in the environment and within the field of view of the camera 110, the spatial filters may be adjusted to ensure that the virtual sound source's location changes according to the changing position of the moving object. Thus, the spatial renderer 180 produces driver signals to drive the speakers 150 of the earphones 140 and 145 to reproduce the sounds of the captured sound field, while producing sounds of the object audio signal at the virtual sound source.

In one aspect, characteristics of the sound of the audio signal at the virtual sound source may change under certain conditions. For instance, the spatial renderer 180 may scale the audio processing operations described herein (e.g., volume, spectral shaping, reverberation, etc.) depending on whether the object that is sonified is moving toward or away from the device 100. For example, if the object is moving towards the device 100, the sound may intensify (e.g., increase in volume), while if the object is moving away, the sound may decrease in intensity (e.g., decrease in volume). In some aspects, the sound of the audio signal may be repeated (e.g., "dinging") for a certain amount of time (e.g., five seconds). While, in another aspect, the sonification of the object may last until the device 100 has moved past the object (e.g., the device 100 moves outside a threshold distance).

Stage 170 of this figure illustrates the functions performed by the rendering processor 135 while in the alert navigation audio rendering mode. This mode is referred to as "alert", because there is a detected object that the device wants to bring to the user's immediate attention, while minimizing other sounds that may distract from the user's attention. In this mode, the device 100 is to emphasize sound of the object audio signal that is associated with a detected object, while deemphasizing at least a portion of all other sounds in order to focus the user's attention on the detected object. In this way, the device 100 may alert the user of the detected object in order to provide the user time to react To do this, similar to the aware mode, the spatial renderer 180 spatially renders the object audio signal to cause the earphones to produce sound of the audio signal at a virtual sound source that corresponds to the position of the detected object. Unlike the aware mode, however, the rendering processor 135 partially activates (e.g., deactivates at least a portion of) the transparency function which causes the speakers 150 of the earphones 140 and 145 to reproduce a portion, not all, of the ambient audio signals captured by the microphones 130 in the microphone array 125. Specifically, the rendering processor 135 adjusts the transparency filters 175 to attenuate at least one of the ambient sounds that the transparency function is to reproduce. For instance, based on the audio content analysis performed by the decision logic 120, the rendering processor 135 may receive instructions from the decision logic 120, indicating which sounds are to be attenuated. More about how the decision logic 120 determines which sounds should be attenuated is described herein. In response, the rendering processor 135 may adapt the transparency filters 175, such that at least one of the sounds captured by the microphone array 125 is attenuated, such that the attenuated sounds are not reproduced by the speakers 150 of the earphones. In one aspect, the adaptation of the transparency filters 175 may fully attenuate (e.g., duck) the sounds, or the sounds may be partially attenuated such that an intensity (e.g., volume) of the sound is reduced (e.g., by a percentage value, such as 50%). In one aspect, the rendering processor 135 may deactivate the transparency filters 175, thereby preventing the spatial renderer 180 from reproducing the ambient sound entirely. In one aspect, the spatial renderer 180 may perform the selective attenuation of the sounds, rather than the attenuation being the result of the adaptation of the transparency filters 175. In particular, the spatial renderer 180 may perform audio processing operations upon the transparency filter signals to attenuate the sounds that are to be reproduced by the speaker 150 of the earphones. For example, the spatial renderer may perform spectral shaping or dynamic range control upon at least some of the filtered signals, or reduce a particular volume of the filtered signals.

Furthermore, the rendering processor 135 is configured to activate an ANC function 185 to cause the speakers 150 of the earphones to produce anti-noise in order to reduce ambient noise from the environment that is leaking into the user's ear. In one aspect, the noise may be the result of an imperfect seal of a cushion of an earphone (e.g., when the earphones 140 and 145 are a pair of headphones) that rests upon the user's ear. The ANC 185 may be implemented as one of a feedforward ANC, a feedback ANC, or a combination thereof. As a result, the ANC 185 may receive a reference microphone signal from a microphone that captures external ambient sound, such as any of the microphones 130, and/or the ANC 185 may receive a reference (or error) microphone signal from a microphone that captures sound from inside the user's ear. This stage also illustrates that the driver signal(s) from the spatial renderer 180 (into the communication link 155) are fed back to the ANC 185. In one aspect, the ANC 185 may implement non-adaptive and/or adaptive ANC. In one aspect, the ANC 185 is configured to produce an anti-noise signal from at least one of the microphone signals, which may also be fed into the spatial renderer 180 (or transparency filter(s) 175). In one aspect, the ANC 185 may produce one or more anti-noise signals for each earphone.

In one aspect, the audio rendering processor 135 is configured to spatially render the object audio signal with the signals from the transparency filters 175 and the ANC 185. Specifically, the audio rendering 135 is configured to combine the anti-noise signal and the filtered signals from the transparency filters 175 into a combined signal. In one aspect, the audio rendering processor 135 may combine the signals to produce a separate combined signal for each speaker of the earphones 140 and 145. The audio rendering processor 135 spatially renders the object audio signal according to the position of the virtual sound source, with the combined signal to produce speaker driver signals for each the speakers of the earphones. Thus, when each of the driver signals drives a corresponding speaker 150, this causes the speakers 150 to reproduce at least a portion of the sound field of the environment with sound of the object audio signal at the position of the virtual sound source. In another aspect, the audio rendering processor 135 may output the combined signal, and spatially render the object audio signal according to the position of the virtual sound source.

In one aspect, the distinct combination of operations described in FIG. 1B for each of the navigation audio rendering modes may be different. For example, in some aspects, the operations performed by the rendering processor 135 while in the normal navigation audio rendering mode may include the ANC function 185. As another example, the operations performed by the rendering processor 135 while in aware navigation audio rendering mode may include spatially rendering the audio icon and activating the ANC function 185, thereby deactivating the transparency filter 175. It can be understood that any combination of functions may be performed by the rendering processor 135 for each of the navigation audio rendering modes.

In one aspect, the decision logic 120 is configured to perform audio content analysis of the microphone signals to decide (or determine) whether one or more sounds captured in the sound field of the environment are to be adjusted (e.g., attenuated). Specifically, the decision logic 120 may determine whether to selectively attenuate at least one of the sounds in the sound field in order to reduce certain sounds, while the object audio signal is outputted through the earphones. Once the adjustments to the sounds are determined, the decision logic 120 is to instruct the rendering processor 135 to selectively attenuate the sounds that would otherwise distract the user from the object audio signal. The decision logic 120 may make the decision based on the type of ambient sounds that are captured. For instance, the decision logic 120 may analyze the sounds to determine what type of sounds are being captured, and base the decision on the type of sounds, such as speech or non-speech sounds. For instance, the decision logic 120 may determine that speech is to be selectively attenuated, in order to focus the user's attention to the object audio signal. As another example, the decision logic 120 may determine to selectively attenuate transient sounds that are of no interest to the user, such as a sound of a lawnmower, a sound of cars honking etc. In one aspect, the decision logic 120 may decide not to selectively attenuate (or partially attenuate) certain sounds. For instance, the decision logic 120 may not attenuate sounds that are related to the detected object of which the decision logic 120 is sonifying. For example, when detected object may be an ambulance with its lights on, but no siren, and the decision logic 120 may not attenuate sounds of a siren of a firetruck that is behind the ambulance. In one aspect, the decision logic 120 may base its decision on an analysis of the spectral content of a sound. In this case, the decision logic may selectively attenuate sounds with a large portion of spectral content (e.g., 50% or more) above a certain frequency (e.g., 400 Hz), since the ANC function may not effectively cancel sounds with a large portion of high frequency content. In one aspect, the decision logic 120 may selectively attenuate sounds that originate at a sound source that is separated by the device 100 by at least a threshold distance (e.g., twenty feet). For example, the decision logic 120 may perform sound localization to identify an origin (or location) of a sound source, and a distance between the sound source and the device 100. Sound sources that are far away from the device 100 may be selectively attenuated, since these sounds are most likely of no consequence to the user.

In one aspect, when the rendering processor is receiving a program audio of a piece of sound program content (e.g., music) to be rendered and outputted through the earphones, the decision logic 120 may decide to reduce the volume of the program audio. Once decided, the decision logic 120 may instruct the rendering processor 135 to perform audio processing operations to reduce the volume of the program audio, such as applying ducking values, or dynamic range compression.

In one aspect, when objects within the environment are emitting sounds, or rather sounds are detected through sound localization at or near a position of a detected object, the decision logic 120 may perform object analysis of the detected object in order to decide whether to selectively attenuate the sounds at or near the object's position. Such operations may be performed when the alert audio rendering mode is selected. Specifically, in a similar manner to that of sonification, the decision logic 120 may determine a level of importance of the object. If the object is determined to be of a high importance (e.g., having an importance value greater than a threshold value), the decision logic 120 may determine not to selectively attenuate the sound associated with the object. While, if the level of importance of the object is low (e.g., having an importance value lower than the threshold value), the decision logic 120 may determine to selectively attenuate the sound associated with the object. In one aspect, the threshold value used to determine whether to selectively attenuate sounds produced by detected objects is different than the threshold value to determine the level of importance by the sonifier.

Figure 2:
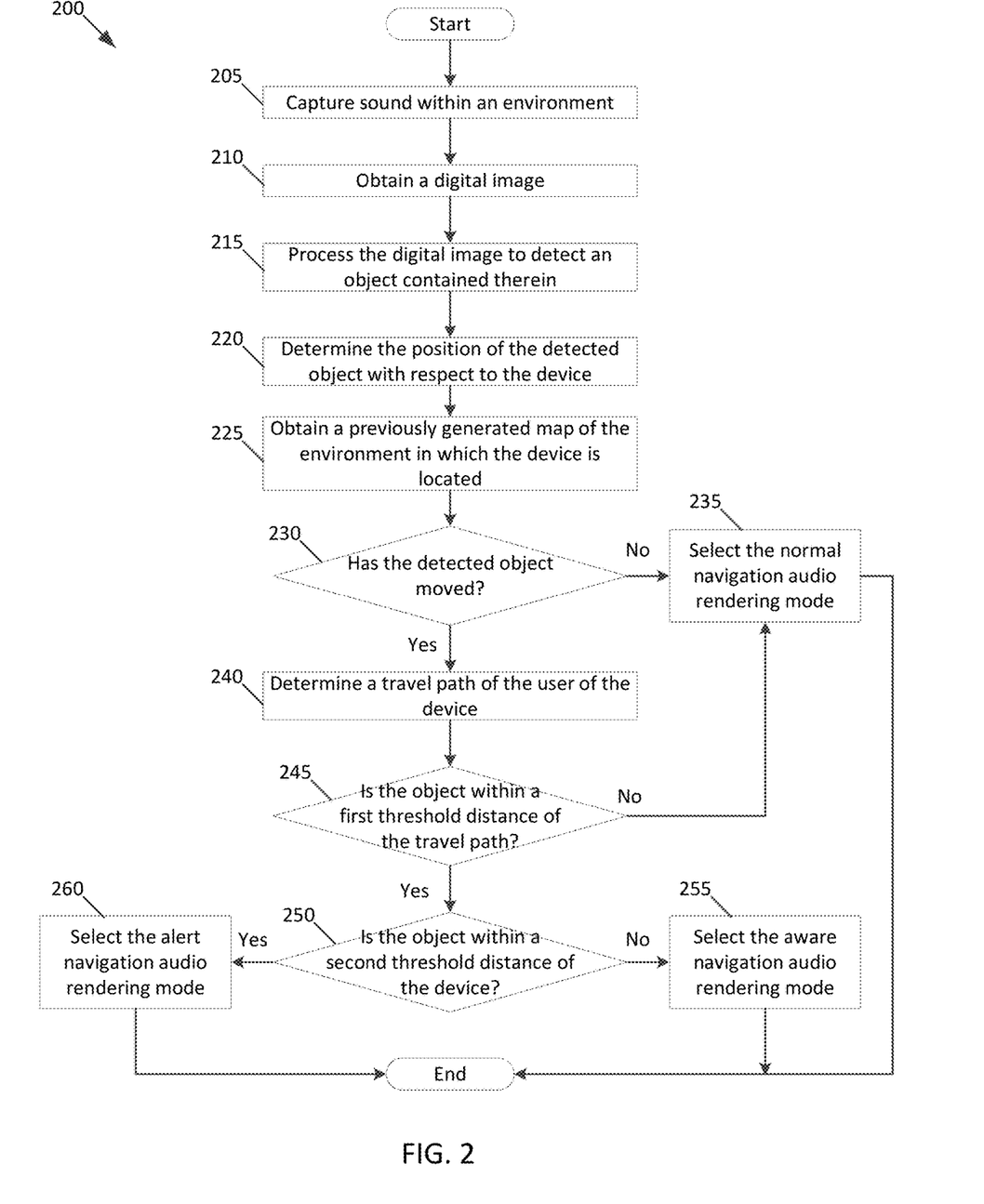
FIG. 2 is a flowchart of one aspect of a process to select a navigation audio rendering mode while providing navigation assistance using a head-worn device.

FIG. 2 is a flowchart of one aspect of a process 200 to select a navigation audio rendering mode while providing navigation assistance using a head-worn device. In one aspect, the process 200 is performed by the device 100, as described in FIGS. 1A-1B. The process 200 will be described with reference to FIGS. 1A-1B. In FIG. 2, the process 200 begins by capturing, using the microphones 130 in the microphone array 125, sound within an environment in which a user of the head-worn device 100 is currently located (at block 205) as at least one ambient audio signal. The process 200 obtains a digital image captured by the camera 110 of the device 100 (at block 210). For instance, the device 100 captures, using the camera 110, a scene of the environment as the digital image. The process 200 processes the digital image to detect an object contained therein (at block 215). The process 200 determines a position of the detected object with respect to the device 100 (at block 220). In one aspect, the image processor 115 (or the decision logic 120) may determine the position of the object as previously described in FIG. 1A, with respect to the generation of the map. The process obtains a previously generated map of the environment in which the device 100 is located, where the map includes a position of the detected object within the environment at a previous period of time, such as a day ago (at block 225). In one aspect, the decision logic 120 may determine a current location of the device 100 (e.g., through location data), and obtain the previously generated map that corresponds to that location. In one aspect, the previously generated map may have been generated by the device 100, when the device 100 was in the environment at the previous period of time, as described herein. In some aspects, the previously generated map may have been generated by a different device. The process 200 determines if the detected object has moved since the previous period of time (at decision block 230). Specifically, the decision logic 120 compares the determined position of the detected object with respect to the device, with the position of the detected object in the obtained previously generated map. In one aspect this determination may be based on whether the detected object has moved past a threshold distance (e.g., a foot). If not, the process 200 selects the normal navigation audio rendering mode (at block 235) in which sound played back by the speakers 150 of the earphones is based on the activation of the acoustic transparency function to cause the speakers 150 to reproduce the sound captured by the microphone array 125. Thus, since the detected object has not moved, the decision logic 120 selects the normal navigation audio rendering mode because if the user is familiar with the environment (e.g., being a room in the user's home), there is little concern that the user will collide with the detected object. In some aspects, the normal navigation audio rendering mode is a "default" mode that is selected by the decision logic 120, until an object is detected within the environment that is to be sonified in order to bring the object to the user's attention.

If, however, the detected object has moved, the process 200 determines a travel path of the user of the device 100 through the environment (at block 240). In one aspect, the decision logic 120 may determine the travel path of the device 100 through the environment based on a user request to receive navigation instructions for a route from a current location to a destination. In other aspects, the decision logic 120 may determine the travel path by predicting a destination at which the device is to travel. In one aspect, the decision logic 120 may use the same or similar criteria as the image processor 115 used to determine if the device 100 is traveling along a previously traveled path. Once predicted, the decision logic 120 may retrieve the travel path between the two locations, based on a stored travel path. The process 200 determines if the detected object is within a first threshold distance (e.g., two feet) of the determined (or predicted) travel path of the device 100 (at decision block 245). For instance, if the distance between the detected object and the determined path of travel exceeds the first threshold distance, it may be assumed although the detected object has moved, there is little chance that the user will collide with the object, while the user is traversing along the travel path. Thus, if the distance between the detected object and the travel path exceeds the first threshold distance, the process 200 proceeds back to block 235 in order to select the normal navigation audio rendering mode.

If, however, the detected object is within the first threshold distance, the process 200 determines if the object is within a second threshold distance (e.g., ten feet) from the device 100 (at decision block 250). If the detected object is beyond the second threshold distance, the process 200 selects the aware navigation audio rendering mode (at block 255) in which sound played back by the speakers 150 of the earphones 140 and 145 is based on 1) the activation of the acoustic transparency function and 2) the sonification of the detected object in the digital image. Entering this mode, the user may be made aware of the object that is within the user's travel path in a less obtrusive way than the alert navigation audio rendering mode, by allowing the user to hear sounds reproduced by the device 100 of the sound within the environment that is picked up by the device's microphones, along with the object audio signal that represents the object. Thus, the object may obstruct the path of the user, but the user is not within the immediate vicinity of the object. For example, the user may be walking on a sidewalk, and twenty feet in front of the user, within the field of view of the camera 110 of the device 100, a car is blocking the sidewalk. As a result, the decision logic 120 may make the user aware of the car that is within the user's path, giving the user enough time to react, such as crossing the street to walk on the opposite sidewalk.

If, however, the detected object is within the second threshold distance, the process 200 selects the alert navigation audio rendering mode (at block 260) in which sound played back by the speakers 150 of the earphones is based on 1) the activation of the ANC function to cause the speakers 150 to playback anti-noise, 2) a partial activation of the acoustic transparency function to cause the speakers 150 to reproduce a portion of the sound captured by the microphone array 125, and 3) the sonification of the detected object in the digital image. Entering this mode, the user is put on alert of the close presence of an object. Continuing with the previous example, rather than detecting the car parked across the sidewalk twenty feet away, the car may abruptly enter a driveway that is two feet in front of the user. As a result, the decision logic 120 selects the alert navigation audio rendering mode to bring the user's attention to the car by minimizing sounds of the environment being reproduced by the earphones, and/or other sounds that are leaking through the earphones, and playing back an object audio signal that represents the car.

Some aspects perform variations of the process 200. For example, the specific operations of the process 200 may not be performed in the exact order shown and described. The specific operations may not be performed in one continuous series of operations, and different specific operations may be performed in different aspects. In one aspect, the process may omit the determination of the travel path of the device 100, and therefore blocks 240 and 245 may not be performed. In this aspect, the process 200 may proceed from decision block 230 to determine if the detected object is within the second threshold distance of the device 100. In some aspects, the process 200 may be repeatedly performed at predefined intervals (e.g., every thirty seconds), to determine if any operations are to be performed in response to a detected object within the environment in which the device 100 is located.

In other variations, rather than selecting a particular mode based on whether the device 100 is to collide with a detected object, the process 200 may select a particular mode in response to the detection of the object. Specifically, the selection may be intended to provide the user contextual information about the detected object. For example, the detected object may convey information that would be helpful to the user, while the user is traversing an environment, such as a "Do Not Enter" sign or a traffic signal (e.g., red, yellow, or green). In one aspect, this variation of process 200 may be based on an analysis of the object, performed by the decision logic 120. For instance, upon detecting the object, the decision logic 120 may select a predefined mode that is associated with the detected object. In some aspects, the decision logic 120 may base the selection of the mode according to the importance of the detected object, as previously described. For example, the decision logic 120 may select the alert navigation audio rendering mode for detected objects having a high level of importance (e.g., higher than a threshold value); while the decision logic may select the aware navigation audio rendering mode for detected objects having a low level of importance. In either case, the process 200 may omit blocks 225-250.

Figure 3:
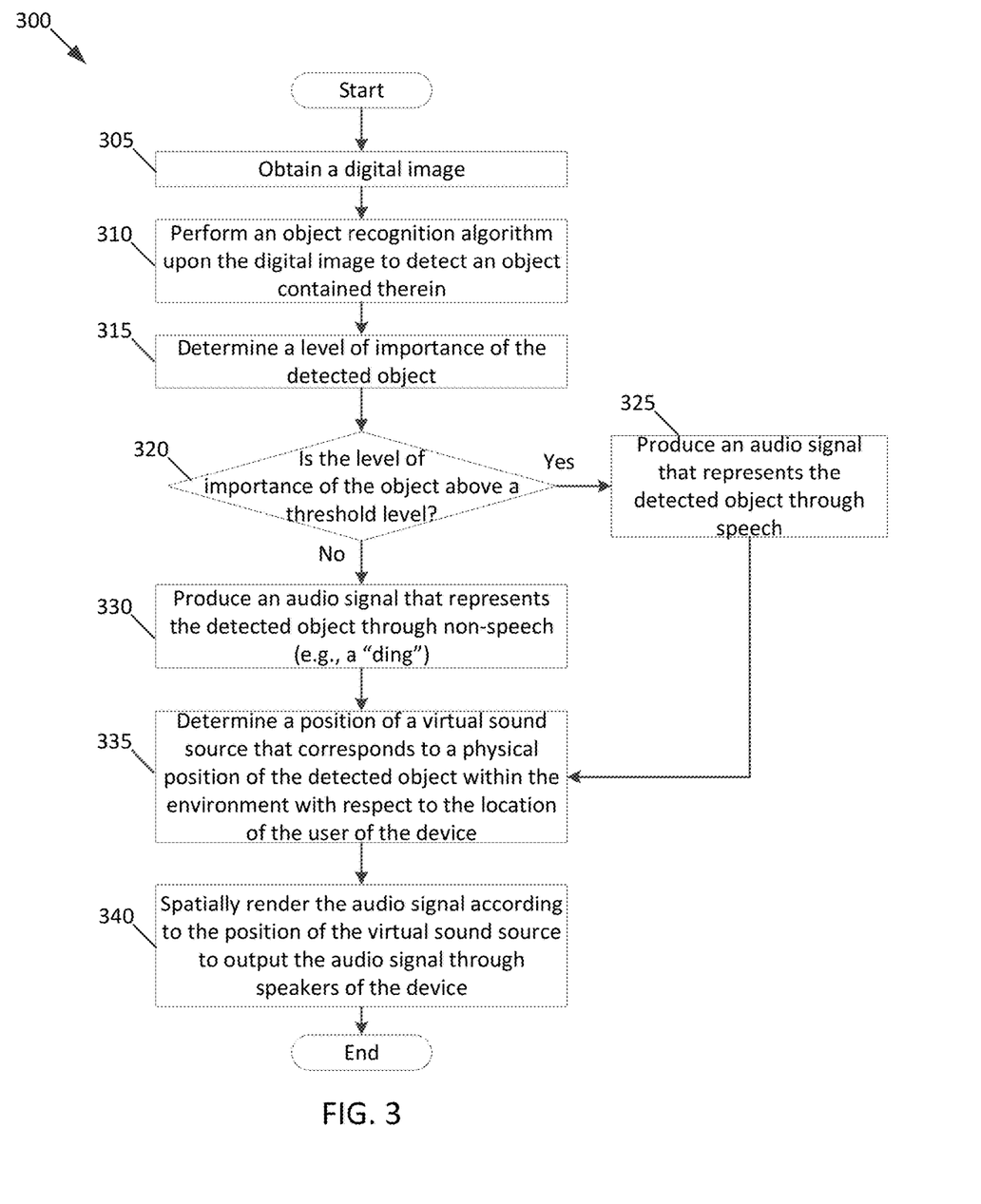
FIG. 3 is a flowchart of one aspect of a process to produce and spatially render an audio signal that is associated with a detected object.

FIG. 3 is a flowchart of one aspect of a process 300 to produce and spatially render an object audio signal that is associated with a detected object. In one aspect, the process 300 is performed by device 100 as described in FIGS. 1A-1B. The process 300 will be described with reference to FIGS. 1-2. In FIG. 3, the process 300 begins by obtaining a digital image captured by a camera, such as camera 110 of device 100 (at block 305). In one aspect, the digital image may have been captured by another device. The process 300 performs an object recognition algorithm upon the digital image to detect an object contained therein (at block 310). In one aspect, these operations may be those that were performed in FIG. 2.

The process 300 determines a level of importance of the detected object within the digital image (at block 315). The level of importance may indicate whether the object audio signal that is to be associated with the detected object is to represent the detected object through speech, non-speech sound cues, or a combination of both. For instance, an audio signal may represent an object through speech, when the object has a high level of importance (e.g., above a threshold level), while the audio signal may represent the object through non-speech sound cues when the object has a low level of importance (e.g., below the threshold level). In one aspect, upon detecting the object, the decision logic 120 determines the level of the object's importance, which may be a predefined value (e.g., between zero to ten). For instance, the decision logic 120 may perform a table lookup into a data structure that stores (e.g., descriptions of) objects and their associated level of importance as the predefined value. In one aspect, the predefined value may be defined by the user, or may be defined by a manufacturer of the device 100.

In some aspects, the decision logic 120 may determine the level of importance by assigning the level of importance to the object according to an analysis of the object. Specifically, the decision logic 120 may perform object analysis upon the object to determine whether the object is meant to convey information, such as text inscribed on a sign or a pedestrian light signal at a crosswalk that includes a counter. Such objects that are meant to convey information may be assigned a high level of importance. In one aspect, the high level of importance may be higher than a threshold level, as described herein. In contrast, the decision logic 120 may assign an object that is not meant to convey information (e.g., an inanimate object, such as a chair) a low level of importance (e.g., lower than the threshold level).

In some aspects, the decision logic 120 may assign an object a high level of importance based on a contextual analysis of the surroundings of the object. For example, when there are multiple objects that are similar, or there are multiple objects that are grouped together, the decision logic 120 may assign a high level of importance to one of the objects, since non-speech sound cues may be confusing to the user in order to decipher which of the objects is being sonified. In one aspect, the contextual analysis may be based on the environment in which the detected object is located. Specifically, the decision logic 120 may determine the type of environment in which the device 100 is located based on the object recognition algorithm, and assign a level of importance to the object according to the type of environment. For example, an object detected in a loud environment (e.g., a busy street corner), may be assigned a high level importance, which may result in the object audio signal of the object having speech. In such a loud environment, speech may be easier for the user to understand, rather than non-speech which may other be drowned out in the loud environment. Whereas, an object detected in a quiet environment (e.g., an open park) may be determined to have a lower level of importance.

In some aspects, the level of importance may be based on the actions performed by the detected object. For instance, if it is determined that the object is moving away from the device 100 (or the device 100 is moving away from the object), the object may be determined to have a low level of importance. If, however, the object is determined to be moving towards the device 100 (or the device 100 is moving towards the object), the object may be determined to have a high level of importance.

The process 300 determines if the level of importance of the object is above a threshold level (at decision block 320). In response to the level of importance being above the threshold level, the process 300 produces an object audio signal (e.g., a first object audio signal) that audibly represents the detected object through speech that audibly describes the object (at block 325). In one aspect, the speech may represent the detected object by describing textual information being conveyed by the object (e.g., lettering/ words inscribed on a street sign). In some aspects, the speech may describe the physical characteristics of detected object (e.g., when the detected object is a red trashcan that is ten feet ahead of the user, the audio icon includes speech of "A red trashcan is ten feet in front of you"). In other aspects, the speech may describe the actions being performed by the detected object (e.g., "The car is turning right in front of you", when the user is in a cross walk). To produce this object audio signal, the decision logic 120 may use a text-to-speech ("TTS") system to produce a synthesized speech description of the object as an audio signal. In response, however, to the level of importance being below the threshold level, the process 300 produces an object audio signal (e.g., a second object audio signal) that audibly represents the detected object through non-speech (e.g., sound cues) that conveys audible information about the object, such as "dings" or single frequency sounds (at block 330). In one aspect, the decision logic 120 may produce either type of audio signal by retrieving the audio signal that is associated with the detected object from local memory. In some aspects, the decision logic 120 may retrieve the audio signal from a storage that is remote from the device 100 (e.g., an electronic database) by transmitting, via the network interface 105, a request message to an electronic server. The electronic server may retrieve the audio signal from the electronic database and then forward the audio icon back to the device 100. In some aspects, the electronic server may produce (or create) the audio signal based on the request message.

With either type of object audio signal produced, the process 300 determines a position of a virtual sound source to be produced by the earphones 140 and 145 that corresponds to a physical position of the detected object within the environment with respect to the location of the user of the head-worn device (at block 335). Specifically, as previously described, the spatial renderer 180 determines the virtual sound source of the detected object using the position of the object that is determined by the decision logic 120 (or the image processor 115), relative to the device 100. The process 300 spatially renders the audio signal produced in either blocks 325 or 330 according to the position of the virtual sound source to output the audio signal through the speakers 150 of the earphones (at block 340).

Some aspects perform variations of the process 300. For example, the specific operations of the process 300 may not be performed in the exact order shown and described. The specific operations may not be performed in one continuous series of operations, and different specific operations may be performed in different aspects. In one aspect, the process 300 may be performed for two or more detected objects. In this case, the level of importance of each object may be determined independently from each other. Once determined, the decision logic 120 may produce an object audio signal that represents speech for one object, while other detected objects that are to be sonified are represented by audio signal that include non-speech. In one aspect, the process 300 may be performed separately for each of several detected objects.

In some aspects, the determined level of importance is dynamic, and thus the audio signal that is spatially rendered may change. For example, the produced object audio signal may represent the object through non-speech, based on a first determined level of importance being below the threshold at a first instance in time. When, however, there is a detected change in the object, the process may increase the level of importance. For instance, the device 100 may continue capturing images and performing object recognition. Upon detecting a change in the object at a second, later, instance in time (e.g., the object begins to move towards the user of the device 100), a second level of importance may be determined. When the second level of importance surpasses the threshold, the device 100 may reproduce the audio signal to represent the detected object through speech. Thus, by switching between non-speech to speech, and vice versa, the device 100 may bring the object to the user's attention. In some aspects, the converse may be true, switching from speech to non-speech.

Figure 4:
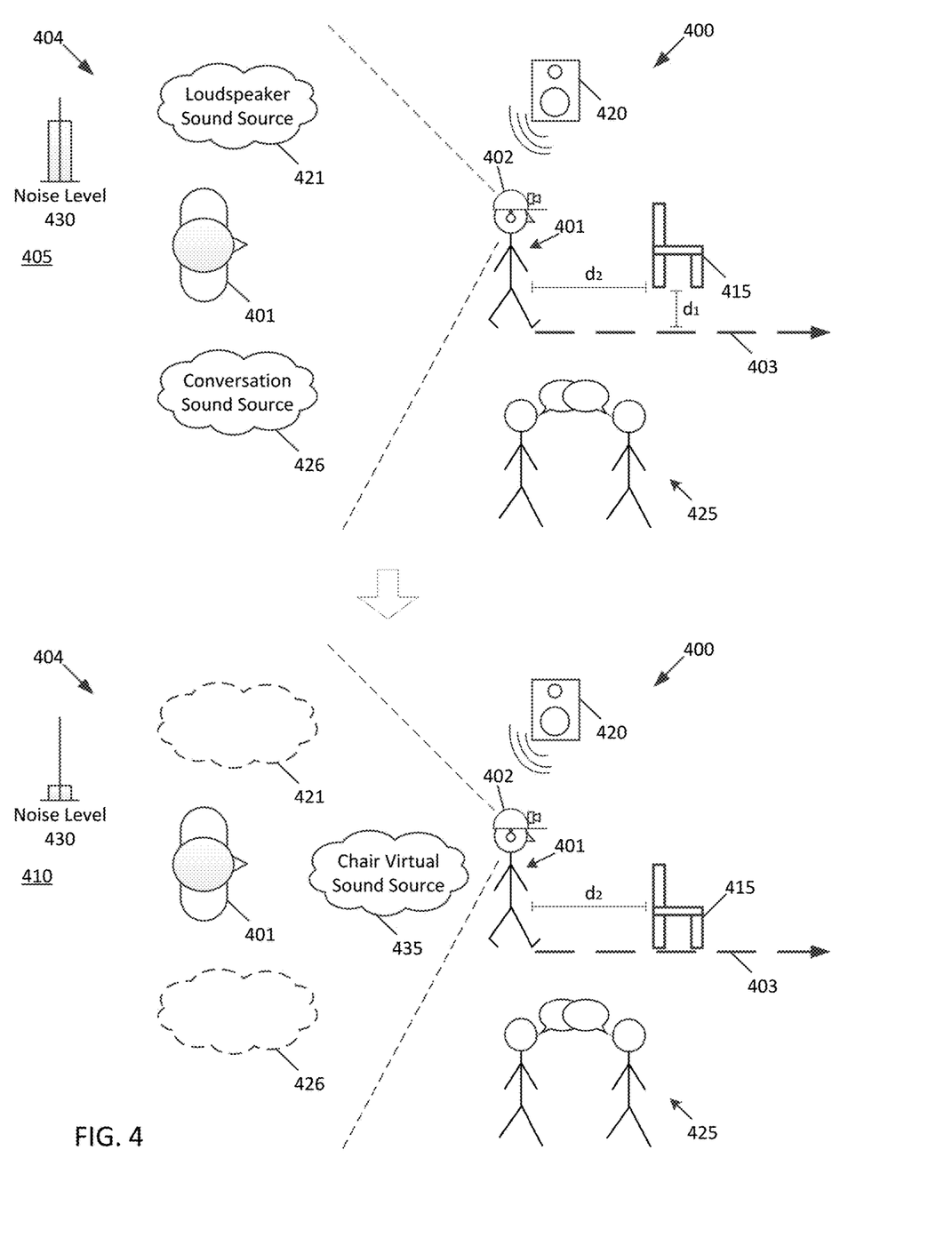
FIG. 4 shows a progression of states of a sound field produced by a head-worn device when changing between navigation audio rendering modes.

FIG. 4 shows a user 401 wearing a head-worn device 402 that is providing navigation assistance, while the user 401 is traveling through an environment 400. The user 401 is wearing a head-worn electronic device 402 that is configured to process digital images captured by a camera of the electronic device 402 to detect objects contained therein. In response to detecting objects, the device 402 performs audio processing operations to produce sound that is to assist the user 401 in navigating the environment 400. In one aspect, the user 401 may be visually impaired, and may rely on the head-worn device 402 to provide information about objects within the environment 400. In this example, the head-worn device 402 is a baseball cap that includes at least a camera, speakers, and microphones. In one aspect, the head-worn device 402 is the same as the device 100 of FIG. 1A. Specifically, this figure illustrates two stages 405 and 410 in which the head-worn device 402 changes from the normal navigation audio rendering mode in which the user 401 is hearing sounds within the environment 400, to the alert navigation audio rendering mode in which some of those sounds are selectively attenuated in order to alert the user 401 of an object within the user's immediate vicinity (e.g., the chair 415 being right in front of the user's travel path 403). Each stage shows the environment 400 in which the user 401 is located therein, and a corresponding sound field 404 of the environment 400 that is reproduced by the head-worn device 402. Sounds within the reproduced sound field 404 of the environment 400 are being heard by the user 401, through earpiece speakers (e.g., the earphones 140 and 145 shown in FIG. 1A) of the head-worn device 402 that are inserted into or on top of the user's ears.

The head-worn device 402 may provide navigation assistance through an explicit request from the user 401, or the device 402 may provide the assistance implicitly. For an explicit request, the user 401 may initiate the navigation assistance through a verbal request that is picked up and processed by the device 402. The user 401 may say a destination, which is used by the device 402 to retrieve a previously generated map of the environment 400 and a route through the environment 400 from the user's present location to the destination. In another aspect, the user may activate the navigation assistance through a user interface of the device 402 or another device (e.g., smartphone) that is wired or wirelessly coupled to the device 402. For implicit navigation assistance, the device 402 may retrieve the previously generated map of the environment 100, and predict a travel path (e.g., travel path 403) through the environment 400 towards a predicted destination based on several criteria, as previously described.

The environment 400 in this case may be a room (e.g., a living room) within the user's house, and includes the user 401, a loudspeaker cabinet 420, a group of people 425, and the chair 415. In this environment 400, the loudspeaker cabinet 420 and the group of people 425 are both producing sound (e.g., the cabinet 420 is producing music, while the group of people 425 are talking).

Stage 405 illustrates the user 401 walking (or traversing) through the environment 400, while the head-worn device 402 provides navigation assistance in the normal navigation audio rendering mode, along a travel path 403 that is clear from any obstructions (e.g., the chair 415). The travel path 403 is a path along which the user 402 has already traveled at a previous time (e.g., a day ago). Since the last time the user 402 has traveled along the path 403, it has remained clear from any obstructions, although very close to the path 403 is the chair 415 that is a distance $d_1$ (e.g., a foot) away from the travel path 403, and at this point the chair 415 is at a distance $d_2$ (e.g., five feet) away from the user 401. While the device 402 is in the normal navigation audio rendering mode, the device 402 produces the sounds of the sound field 404 within the environment 400 through the activation of the acoustic transparency function, as previously described. In this particular case, the user 401 can hear the music 421 produced by the loudspeaker 420 coming from the left hand side of the user 401, and can hear a conversation 426 being conducted by the group of people 425 coming from a right hand side of the user 401. Furthermore, while in the normal navigation audio rendering mode, the device 402 does not have any ANC function activated, resulting in a high level 430 of noise (e.g., white noise) from the environment 400 being experienced by the user 401.

Unlike conventional approaches that may arbitrarily alert of a user of objects that are within a close proximity to the user, the device 402 of the present disclosure limits alerting the user of detected objects that have changed positions since the last time the user 401 has encountered the objects. For example, in the present example, a conventional device that is configured to aid visually impaired users may alert the user 401 of the presence of the chair 415, since the chair 415 is right in front of the user 401. Such devices may use proximity sensors that react to objects that are within a particular distance of the device (e.g., ten feet). Such conventional devices, however, may overwhelm the user with unnecessary alerts when the user is within an environment with many objects. The present disclosure, on the other hand leverages the user's existing knowledge of the environment 400, and only alerts the user when things within the environment have changed. In the present case, as the user is moving along the travel path 403, the camera (e.g., camera 110) of the device 402 captures a digital image that includes the chair 415, which is in the field of view of the camera. The device 402 detects the chair 415 (e.g., through object recognition), and compares the current position of the chair 415 with the position of the chair 415 in a previously generated map of the environment 400 to determine if the chair 415 has moved since the previous time. The device 402 determines that the chair 415 has not moved, and thus as shown in this stage 405, the device 402 selects the normal navigation audio rendering mode.

Stage 410 illustrates the result of the device 402 changing to the alert navigation audio rendering mode, in response to the device 402 detecting that the chair 415 has moved from its previous position, and that the chair 415 is within close proximity to the user 401. Unlike stage 405 in which the travel path 403 is free of obstruction, in stage 410, the chair 415 has been placed close to or within the immediate path 403 of the user 401. For example, the device 402 determines that the chair 415 is within the first threshold distance and the second threshold distance, as described in FIG. 2. As a result, and in order to avoid bumping into the chair 415, the device 402 transitions to the alert audio rendering mode. This mode, as previously mentioned, is a mode in which the device 402 brings an object to the user's attention, while trying to minimize other sounds within the sound field 404 that is being reproduced by the device 402. To minimize sounds, the device 402 may deactivate (or partially activate) the acoustic transparency function by selectively attenuating sounds that were previously being reproduced. In this case, the device 402 selectively attenuates the music 421 and the conversation 426, as indicated by the clouds being now dashed. In addition, the device 402 may activate the ANC function to reduce ambient noise to a reduced level 430 in order to reduce any sounds that would otherwise distract from the user's attention.

To bring the chair 415 to the user's attention, the device 402 is configured to sonify the chair 415, as previously described. Specifically, the device 402 produces an object audio signal that represents the chair through speech (e.g., "Chair!"), and spatially renders and outputs the audio signal at a virtual sound source 435 in the sound field 404 of the environment 400. As illustrated, the virtual sound source 435 is placed in front of the user 401, at a location that represents the location of the chair 415. Thus, by alerting the user 401 that a chair is in the user's travel path 403, the user 401 may take immediate action (e.g., stop, or move to the left/right) in order to avoid the chair 415.

As previously explained, an aspect of the disclosure may be a non-transitory machine-readable medium (such as microelectronic memory) having stored thereon instructions, which program one or more data processing components (generically referred to here as a "processor") to perform the audio signal processing operations, sound pickup operations, and image processing operations. In other aspects, some of these operations might be performed by specific hardware components that contain hardwired logic. Those operations might alternatively be performed by any combination of programmed data processing components and fixed hardwired circuit components.

While certain aspects have been described and shown in the accompanying drawings, it is to be understood that such aspects are merely illustrative of and not restrictive on the broad disclosure, and that the disclosure is not limited to the specific constructions and arrangements shown and described, since various other modifications may occur to those of ordinary skill in the art. The description is thus to be regarded as illustrative instead of limiting.

In some aspects, this disclosure may include the language, for example, "at least one of [element A] and [element B]." This language may refer to one or more of the elements. For example, "at least one of A and B" may refer to "A," "B," or "A and B." Specifically, "at least one of A and B" may refer to "at least one of A and at least one of B," or "at least of either A or B." In some aspects, this disclosure may include the language, for example, "[element A], [element B], and/or [element C]." This language may refer to either of the elements or any combination thereof. For instance, "A, B, and/or C" may refer to "A," "B," "C," "A and B," "A and C," "B and C," or "A, B, and C."

What is claimed is:

1. A method comprising:
capturing, using a plurality of microphones, ambient sound of an environment in which a user wearing a head-worn device is located as a plurality of microphone audio signals;
capturing, using a camera, a scene of the environment as image data;
processing the image data to detect an object contained therein;
determining that the object is beyond a threshold distance from a future portion of a predicted travel path of the user; and
in response to determining that the object is beyond the threshold distance of the future portion of the predicted travel path of the user, selecting an audio rendering mode in which an acoustic transparency function is at least partially activated which causes at least one speaker of a plurality of speakers to reproduce at least a portion of the ambient sound.

2. The method of claim 1, wherein the threshold distance is a first threshold distance, wherein the method further comprises determining that the object is beyond a second threshold distance from the user, wherein the audio rendering mode is selected in response to determining that the object is beyond the first and second threshold distances from the future portion of the predicted travel path of the user.

3. The method of claim 1, wherein the audio rendering mode is a first audio rendering mode and the threshold distance is a first threshold distance, wherein the method further comprises;
determining that the object is within the first threshold distance of the predicted travel path and is within a second threshold distance of the user; and
in response to determining that the object is within the first threshold distance of the predicted travel and within the second threshold distance of the user, transitioning from the first audio rendering mode to a second audio rendering mode in which 1) an active noise cancellation function is activated to cause at least one speaker of the plurality of speakers to produce anti-noise, 2) the acoustic transparency function is at least partially activated, and 3) the object is sonified by an audio signal having a sound associated with the object being spatially rendered to cause the plurality of speakers to spatially produce the sound.

4. The method of claim 1, wherein the threshold distance is a first threshold distance and the audio rendering mode is a first audio rendering mode, wherein the method further comprises:
determining that the object is 1) within the first threshold distance from the predicted travel path, and 2) not within a second threshold distance of the user; and
transitioning to a second audio rendering mode in which 1) the acoustic transparency function is at least partially activated and 2) the object is sonified by an audio signal having a sound associated with the object being spatially rendered to cause the plurality of speakers to spatially produce the sound.

5. The method of claim 1 further comprising obtaining a map of the environment through which the predicted travel path traverses and in which the head-worn device is located, the map comprising positions of one or more objects within the environment, relative to a location of the head-worn device, wherein processing the image data to detect the object contained therein comprises determining that a position of the object is different than a position of the object within the map.

6. The method of claim 5, wherein the threshold distance is a first threshold distance, and the audio rendering mode is a first audio rendering mode,
wherein the method further comprises selecting, in response to determining that the object is 1) at a different position, and 2) within a second threshold distance from the user, a second audio rendering mode in which 1) an active noise cancellation function is activated, 2) the acoustic transparency function is at least partially activated, and 3) the object is sonified through the plurality of speakers.

7. The method of claim 1 further comprising sonifying the object by producing an audio signal that includes a sound that audibly represents the object.

8. The method of claim 7, wherein the sound comprises either 1) non-speech sound cues or 2) speech audio that audibly describes the object.

9. A method performed by a processor of a head-mounted device, the method comprising:
capturing, using a camera and while a user is wearing the head-mounted device, a scene of an environment as image data;
processing the image data to detect an object within the environment;
obtaining a plurality of microphone signals from a plurality of microphones;
determining whether the object is within a threshold distance of a future portion of a predicted travel path of the user;
in response to determining that the object is within the threshold distance of the future portion of the predicted travel path,
producing a first filtered audio signal by filtering at least one microphone signal of the plurality of microphone signals based on a transparent hearing filter,
obtaining an object audio signal associated with the object,
producing a set of spatially rendered audio signals by spatially rendering the object audio signal based on a position of the object within the environment, and
driving a plurality of speakers of the head-mounted device with a plurality of speaker driver signals based on at least the set of spatially rendered audio signals and the first filtered audio signal; and
in response to determining that the object is not within the threshold distance of the future portion of the predicted travel path,
producing a second filtered audio signal by filtering at least one microphone signal of the plurality of microphone signals based on the transparent hearing filter; and
driving at least one speaker of the plurality of speakers with the second filtered audio signal.

10. The method of claim 9, wherein obtaining the object audio signal associated with the object comprises sonifying the object to produce the object audio signal that audibly represents the object.

11. The method of claim 9, wherein the object audio signal comprises either non-speech sound cues or speech that audibly describes the object.

12. The method of claim 9 further comprising obtaining a map of the environment through which the future portion of the predicted travel path traverse and in which the head-mounted device is located, the map comprising positions of one or more objects within the environment, relative to a location of the head-mounted device within the environment, wherein processing the image data to detect the object comprises determining that the position of the object is different than a position of the object within the map.

13. The method of claim 9 further comprising, in response to the determining that the object is within the threshold distance of the future portion of the predicted travel path, producing an anti-noise signal based on one or more microphone signals, wherein the plurality of speaker driver signals is further based on the anti-noise signal.

14. The method of claim 9,
wherein the at least one microphone signal comprises a first sound and a second sound, each of which were captured from within the environment,
wherein the first filtered audio signal comprises the first sound without the second sound that was selectively attenuated based on the transparent hearing filter,
wherein the second filtered audio signal comprises the first sound and the second sound.

15. A method performed by a programmed processor of a head-worn device comprising:
capturing, using a camera, a scene of an environment as image data;
performing an object recognition algorithm upon the image data to detect an object within the environment;
determining a level of importance of the object;
responsive to the level of importance being above a threshold level, producing a first audio signal that comprises speech that audibly describes the object;
responsive to the level of importance being below the threshold level, producing a second audio signal that comprises non-speech sound cues; and
spatially rendering either the first audio signal or the second audio signal through a plurality of speakers.

16. The method of claim 15, wherein producing the first audio signal comprises retrieving the first audio signal that is associated with the object from at least one of a local memory storage of the head-worn device or a storage remote from the head-worn device.

17. The method of claim 15, wherein determining the level of importance of the object comprises:
analyzing the object to determine that the object is meant to convey information; and
assigning the level of importance to the object, which is higher than the threshold level.

18. The method of claim 15, wherein determining the level of importance of the object comprises:
determining a type of environment in which the device is located; and
assigning the level of importance to the object according to the type of environment.

19. The method of claim 15, wherein the speech audibly describes the object by at least one of 1) describing physical characteristics of the object, 2) describing actions being performed by the object, and 3) describing textual information being conveyed by the object.

20. The method of claim 15, wherein the level of importance is a first level of importance, wherein the first audio signal is produced and spatially rendered, in response to the first level of importance of the object being below the threshold level at a first instance in time, wherein the method comprises:
detecting, at a second instance in time that is after the first instance in time, a change in the object;
determining a second level of importance of the object that is higher than the threshold level; and spatially rendering the second audio signal instead of the first audio signal through the plurality of speakers.

\* \* \* \* \*